United States Patent Office 3,262,964
Patented July 26, 1966

3,262,964
HALO-SULFONE PRODUCTION
Frederick F. Rust, Orinda, and Harold W. Moore, Menlo Park, Calif., assignors to Shell Oil Company, New York, N.Y., a corporation of Delaware
No Drawing. Filed Aug. 12, 1963, Ser. No. 301,662
10 Claims. (Cl. 260—465.7)

This invention relates to a novel process for the production of sulfones. More particularly it relates to the addition of a sulfonyl halide to an olefin.

Numerous methods are known for the production of sulfones. Typical of these are the oxidation of a sulfide to the corresponding sulfone with hydrogen peroxide or other inorganic oxidizing agents, and the sulfonation of aromatic hydrocarbons with sulfonic acids or sulfonyl halides. These methods are limited by the availability of the sulfide reactant in the first instance, and by the limited applicability of the reaction process in the second instance. Such processes are suitable for the production of many dihydrocarbyl sulfones, but have limited utility in the production of sulfones possessing additional reactive substituents, particularly when the sulfone is aliphatic.

Ladd et al., U.S. 2,606,218, describe the reaction of trichloromethylsulfonyl chloride with styrene in the presence of a peroxide catalyst. The product, however, contains no sulfur, as sulfur dioxide is lost from the sulfonyl chloride, and the elements of carbon tetrachloride are added to the olefinic linkage. The U.S. Patents 2,521,068 and 2,573,580 to Ladd describe the production of telomers by the peroxide-catalyzed reaction of p-chlorobenzenesulfonyl chloride with olefins and olefinic esters.

It is an object of the present invention to provide a novel process for the production of sulfones. More particularly, it is an object to provide a process for the addition of sulfonyl halides to olefins.

It has now been found that these objects are accomplished by the process of reacting a sulfonyl halide with an olefin to produce a β-halo sulfone as a 1,2-addition product, which process is conducted in the presence of certain metallic compounds as catalyst.

The metallic compounds which have been found to be useful catalysts for the process of the invention are copper compounds, particularly salts comprising copper cations, either in the cuprous or cupric valence state, and simple anions, organic or inorganic. Although copper compounds such as the oxide, carbonate, acetate, sulfate and the like are operable, best results are obtained when the catalyst employed is a halide, e.g., fluoride, chloride, bromide or iodide. Preferred are copper halides wherein the halogen has an atomic number from 17 to 35, that is, the middle halogens, chlorine and bromine. Although cuprous salts are generally preferred over the corresponding cupric salt, in most cases, cupric salts give satisfactory results. Particularly preferred as catalyst for the process of the invention is cuprous chloride.

The copper compounds are employed in catalytic amounts. While the optimum amount of catalyst will depend upon the particular copper compound, sulfonyl halide and olefin employed, amounts of catalyst from about 0.005 mole to about 0.5 mole per mole of limiting reactant are generally satisfactory, although amounts of catalyst from about 0.05 mole to about 0.2 mole per mole of limiting reactant are preferred.

The sulfonyl halide is a mono- or poly-halosulfonated organic compound. Preferred sulfonyl halides are represented by the formula R—(—SO$_2$X)$_n$ wherein R is a mono- to $n$-valent organic, preferably hydrocarbon, radical having up to 40 carbon atoms, X represents halogen and $n$ is a whole number from 1 to 6 inclusive.

The organic moiety of the sulfonyl halide reactant, R, is aliphatic, including acyclic or alicyclic, or aromatic, and is substituted with from 1 to 6 sulfonyl halide substituents. R is a hydrocarbon radical, that is, contains only carbon and hydrogen, or is a substituted-hydrocarbon radical, with non-hydrocarbon substituents such as halogen, nitro, acyl, hydrocarbylsulfonyl, sulfo, hydrocarbyloxy, hydrocarbylsulfonyloxy, hydrocarbylsulfonamido, acyloxy, acylamino and the like. In addition, although less preferred for reasons of the diminished reactivity thereof, R is suitably a hydrocarbyl moiety which serves as a monomer in a halosulfonated polymeric or co-polymeric material, e.g., a halosulfonated ethylene monomer in a polyethylene or ethylene-propylene polymer. Preferred R groups are those having from 1 to 20 carbon atoms and from 1 to 3 sulfonyl halide substituents.

The term X in the above-depicted formula represents halogen, that is, fluorine, chlorine, bromine or iodine, and sulfonyl fluorides, sulfonyl chlorides, sulfonyl bromides and sulfonyl iodides are operable in the process of the invention. Within a sulfonyl halide molecule, all X substituents may be the same, or two or more X groups may represent different halogens. Preferred, however, are sulfonyl halides wherein all X groups, if more than one sulfonyl halide radical is present, represent the same halogen. Further preferred are the sulfonyl halides wherein the halogen has an atomic number of from 17 to 35, i.e., the middle halogens chlorine and bromine, and optimum results are obtained when the sulfonyl halide is a sulfonyl chloride.

Aliphatic sulfonyl halides suitable as reactants are those sulfonyl halides wherein the sulfonyl halide radical is attached to an aliphatic carbon atom, and include cycloaliphatic and aromatic-substituted aliphatic sulfonyl halides. Although aliphatic sulfonyl halides wherein the aliphatic moiety possesses olefinic or acetylenic unsaturation are in part operable, preferred aliphatic sulfonyl halides contain no non-aromatic carbon-carbon unsaturation. Illustrative hydrocarbon aliphatic sulfonyl halides are exemplified by alkyl, including aralkyl, sulfonyl halides such as methanesulfonyl chloride, methanedisulfonyl chloride, methanetrisulfonyl bromide, ethanesulfonyl chloride, 2-propanesulfonyl fluoride, propanesulfonyl iodide, hexanesulfonyl fluoride, 1,2-ethanedisulfonyl chloride, 1,1-ethanedisulfonyl bromide, β-phenylethanesulfonyl iodide, benzylsulfonyl bromide, 1,5-pentanedisulfonyl chloride, 1,2,6-hexanetrisulfonyl bromide and the like, while acyclic aliphatic sulfonyl halides possessing non-hydrocarbyl substituents include 3-chlorobutanesulfonyl chloride, 5 - carbethoxypentanesulfonyl fluoride, 3-dimethylamino-2-methylbutanesulfonyl chloride, 6-acetylhexanesulfonyl bromide and the like. Sulfonyl halides suitable as reactants include hydrocarbyl sulfonyl halides such as cyclohexanesulfonyl chloride, cyclopentanesulfonyl chloride, 1,4-cyclohexanedisulfonyl bromide, tetrahydronaphthalene-1,8-disulfonyl iodide, 2-methylcyclohexanesulfonyl fluoride, and 3-phenylcyclopentanesulfonyl chloride, as well as substituted-hydrocarbyl cycloalkyl sulfonyl halides such as 3-chlorocyclohexanesulfonyl chloride, 1,4-(2-diethylaminocyclohexane)disulfonyl bromide, 3-carbomethoxycyclopentanesulfonyl chloride and 4-methylsulfonylcycloheptanesulfonyl bromide.

Aromatic sulfonyl halide reactants have from 1 to 6 aromatic rings which are fused or non-fused, but preferably have from 1 to 2 aromatic rings. Exemplary aromatic sulfonyl hailfdes include benzenesulfonyl chloride, benzenedisulfonyl chloride, p-toluene sulfonyl chloride, m-bromobenzenesulfonyl bromide, p-chlorobenzenesulfonyl chloride, p-tert-butylbenzenesulfonyl iodide, 1-naphthalenesulfonyl fluoride, 1,4-naphthalenedisulfonyl bromide, 4-chlorosulfonylphenyl methanesulfonate, p-methoxybenzenesulfonyl bromide, 2,4-dimethylbenzenesulfonyl chloride, N-methyl-N-ethylsulfonyl-p-chlorosulfonylaniline, bis(4-chlorosulfonylphenyl)methane, and di(3-bromosulfonylphenyl).

Further preferred are organic mono- to trisulfonyl halides, particularly mono, wherein the organic moiety is saturated aliphatic, particularly alkyl, having 1 to 18 carbon atoms, preferably 1 to 10, or is mononuclear aromatic, particularly aryl, having 6 to 10 carbon atoms.

The sulfonyl halides are prepared by conventional methods, as by halosulfonation of a hydrocarbon or conversion of the corresponding sulfonic acid to the sulfonyl halide by treatment with an inorganic halide, e.g., thionyl halide.

The sulfonyl halide is reacted with an olefin. By olefin is meant a compound possessing at least one carbon-carbon double bond, and no carbon-carbon double bonds that are conjugated with other carbon-carbon non-aromatic unsaturation. Suitable olefins have from 2 to 20 carbon atoms and from 1 to 3 isolated, i.e., non-conjugated, carbon-carbon double bonds. The olefin is cyclic or acylic, and is hydrocarbyl, that is, contains only atoms of carbon and hydrogen, or may be substituted hydrocarbyl containing non-hydrocarbyl substituents such as cyano, acyl, carboalkoxy, carboaryloxy, alkoxy, halo, nitro, formyl, sulfo, sulfonyl and the like. The olefinic linkage(s) may be terminal or internal, or both if more than one olefinic linkage is present. The olefin may be wholly aliphatic, including cycloaliphatic, or may contain aromatic moieties, but preferably contains no acetylenic unsaturation. In addition, the olefinic linkage may be present in a moiety serving as a monomer in a polymeric material, e.g., the remaining isolated olefinic linkages in a butadiene, isoprene or styrene-butadiene polymer.

Illustrative olefinic compounds include propylene, ethylene, 1-butene, 2-butene, isobutylene, 1-hexene, 1-octene, biallyl, 1,7-octadiene, 1,4-dichloro-2-butene styrene allylbenzene 1,4-diallylnaphthalene, propenylbenzene, allyl acetate, allyl hexanoate, ethyl acrylate, allyl crotonate, acrylonitrile, crotononitrile, allyl chloride, vinylcyclohexane, 2-bromo-3-heptene, 6-fluoro-1-nonene, 3-butenyl methyl ketone, p-nitrostyrene, 1-phenyl-3-hexene, propenyl benzoate, diallyl ether, bis(4-octenyl)sulfone and nonyl 3-butenyl ether. Suitable cyclic olefinic compounds contain ta least one carbon atom of at least one olefinic linkage as a member of a cyclic ring, which ring may be carbocyclic or heterocyclic. Such cyclic olefinic compounds include cyclohexene, cyclopentene, 1,4-cylohexadiene, cyclooctene, 4-chlorocyclohexene, 1,3,5-triethylcyclopentene, 4-methylenecyclohexene, 1,5-cyclooctadiene, 5,6-dihydro-2H-pyran and sulfolene.

Preferred olefins have from 2 to 10 carbon atoms and further preferred are olefins which are cyclic hydrocarbon monoolefins having from 2 to 10 carbon atoms; also preferred are those acylic hydrocarbon monoolefins wherein the olefinic linkage is terminal.

The sulfonyl halide and olefin reactants may be employed in any convenient ratio as an excess of either does not appear to be detrimental to the process of the invention. Suitable raitos will of course depend upon the functionality of the olefin and the sulfonyl halide, that is, the number of olefinic linkages or sulfonyl halide groups present in the reactant molecules, as a polysulfonyl halide may react with more than one molecule of olefin if sufficient olefin is present, or more than one molecule of sulfonyl halide may react with an olefin molecule containing more than one olefinic linkage. Molar ratios of sulfonyl halide group to olefinic linkage from about 5:1 to about 1:5 are satisfactory, although molar ratios from about 2:1 to about 1:2 are preferred. Frequently advantageous use is made of molar ratios that are substantially stoichiometric, that is a molar ratio of sulfonyl halide group to olefinic linkage of about 1:1.

The process of the invention is conducted in liquid phase solution. Solvents that are suitable are liquid at reaction temperature and pressure, are capable of dissolving the reactants, and are substantially inert towards the sulfonyl halide and olefin reactants as well as the sulfones produced therefrom. Preferred solvents for the process of the invention are polar, that is, contain uneven charge distribution, Illustrative solvents include the ethers, e.g., acyclic ethers such as diethyl ether, dibutyl ether and methyl hexyl ether, and lower alkyl ethers (full) of polyhydric alcohols such as ethylene glycol, glycerol, diethylene glycol and 1,2,6-hexanetriol wherein the alkyl groups have from 1 to 4 carbon atoms, as well as cyclic ethers such as dioxane, tetrahydrofuran, tetrahydropyran and dioxolane; the nitriles, particularly lower alkyl nitriles such as acetonitrile, propionitrile and butyronitrile; sulfones such as dimethyl sulfone, diethyl sulfone, propyl hexyl sulfone, diphenyl sulfone and sulfolane; and N,N-dialkylamides, such as dimethyformamide and N,N-diethyl acetamide. Preferred solvents comprise the nitriles, especially cyanoalkanes, and particularly preferred is acetonitrile.

The process of the invention is conducted over a wide range of temperatures. Temperatures from about 50° C. up to the decomposition temperature of the reactants, catalyst or reaction products are in general satisfactory, although temperatures above 200° C. offer little further advantage. Temperatures from about 70° C. to about 170° C. are preferred. The reaction process is conducted at atmospheric, subatmospheric or superatmospheric pressure, so long as the reaction mixture is maintained substantially in the liquid phase. Particularly preferred pressures are those generated by the reaction mixture when heated to reaction temperature in a sealed reaction vessel, which pressures are somewhat but not substantially higher than atmospheric pressure.

The process of the invention is preferably conducted under substantially anhydrous conditions, as moisture, if present, hydrolyzes a portion of the sulfonyl halide reactant, thereby lowering the yield of product. However, small amounts of water, e.g., up to about 1–2% of the reaction mixture, may be tolerated without losing the advantages of the process of the invention.

The reactants are mixed together and maintained at reaction temperature until reaction is complete. Typical reaction times vary from about 10 to about 60 hours when reaction temperatures on the order of 80–85° C. are employed, although some particularly reactive olefins effectively utilize shorter reaction times, and the time required for reaction is generally decreased by employing higher reaction temperatures. The method of mixing the reactants is not material. One reactant may be gradually added to the other, as by bubbling a gaseous olefin into a mixture of sulfonyl halide, catalyst and solvent, although it is equivalently useful to initially mix the entire amounts of reactants. Subsequent to reaction, the products are separated and recovered by conventional methods, as by fractional distillation, selective extraction or crystallization.

The products of the invention are β-halo sulfones, illustratively produced by cleavage of the sulfur-halogen bond of the sulfonyl halide reactant and subsequent 1,2-addition of the moieties thus produced to the olefinic linkage of the olefin reactant. When the preferred sulfonyl halide reactants are employed, the formation of product is illustrated by the equation below:

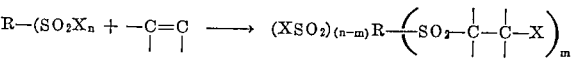

wherein R, X and $n$ have the previously stated significance and $m$ is a whole number from 1 to $n$ inclusive representing the number of sulfonyl halide groups which have added to olefin linkages. Preferred products are those wherein $m=n$, i.e., the products formed when all sulfonyl halide groups of the sulfonyl halide reactant have reacted with olefin.

Illustrative products formed by reaction of the preferred suplfonyl halides with acyclic olefins include hexyl 2-chloroethyl sulfone, methyl 2-chlorooctyl sulfone, phenyl 2-bromopropyl sulfone, 1,3-bis(2-chloroethylsulfonyl)benzene, tris(2-bromo-1-methylpropylsulfonyl)-methane, phenyl 2-chloro-2-phenylethyl sulfone, 1,2-bis-(2-iodohexylsulfonyl)ethane, 2-bromo-3-methylsulfonylpropyl acetate, 2,5-difluoro-1,6-bis(butyl-sulfonyl)hexane, 1,3,4-tribromo-2-(4-methoxyphenylsulfonyl)butane, 4-chlorosulfonylphenyl 2-chloroethyl sulfone and 5-nitronaphthyl 2-chloroheptyl sulfone.

Exemplary products produced from cyclic olefins include 2-chlorocyclohexyl methyl sulfone, 2-bromocyclopentyl phenyl sulfone, 2,4-dichloro-1,5-bis(methylsulfonyl)cyclohexane, 1-chlorocyclohexylmethyl p-tolyl sulfone, 2-fluorocyclohexyl p-fluorophenyl sulfone, 4-chloro-3-methylsulfonyltetrahydropyran and 2,5-dichlorocyclooectyl 4-bromobutyl sulfone.

The products of the invention are useful chemical intermediates. The halogen substituent may be reacted with alkoxides or phenoxides to form ethers, with salts of carboxylic acids to form useful esters, or with sodium hydrosulfide to form the corresponding thiol derivatives. The β-halo sulfones may be dehydrohalogenated by treatment with base to form sulfones with ethylenic linkages from which useful polymeric materials may be produced, or alternatively the ethylenic linkages may be epoxidized to form epoxy resin precursors or polyols upon subsequent hydrolysis. In addition, the β-halo sulfones are useful agricultural chemicals.

A particularly useful application of the process of the invention is in the modification and cross-linking of polymeric material, particularly rubber. Polymers containing halosulfonyl substituents may be reacted with olefins to introduce side chains onto the polymer. Alternatively, polymers containing isolated ethylenic linkages are reacted with sulfonyl halides to introduce sulfone substituents upon the polymer, or are closs-linked by reaction with polyfunctional sulfonyl halides.

To further illustrate the process of the invention, the following examples are provided. It should be understood that they are not to be regarded as limitations, as the teachings thereof may be varied as will be understood by one skilled in this art.

Example I

In a glass ampule of approximately 50 ml. volume were mixed 5.7 g. of methanesulfonyl chloride, 5.6 g. of 1-octene, 0.5 g. of cuprous chloride and 10 ml. of acetonitrile. The tube was cooled in liquid nitrogen, sealed, and allowed to stand at room temperature for 16 hours and at 75° C. for 48 hours. The tube was cooled and opened and the reaction mixture was treated with 100 ml. of water. The organic layer was separated, dried over anhydrous magnesium sulfate, and allowed to stand at room temperature to permit the evaporation of unreacted starting material. Two grams of product, and 18% conversion based upon starting material, was obtained which melted at 29–30° C. when recrystallized from ethanol. The infrared and nuclear magnetic resonance spectra of the white crystalline product were consistent with the structure methyl 2-chlorooctyl sulfone.

Example II

To a 310 ml. pressure vessel was charged 55 g. of m-benzene-disulfonyl chloride, 2 g. of cuprous chloride and 200 ml. of acetonitrile. The vessel was pressurized to a 20 g. weight increase with ethylene. The reaction mixture was maintained at 93° C. for 18 hours, at which time the pressure remained constant. The vessel was cooled and vented and the product mixture was removed. The solvent was removed to give a theoretical yield of crude product. A portion of the product, recrystallized from ether-ethanol had a melting point of 116–118° C. The nuclear magnetic resonance and infrared spectra were consistent with the structure 1,3-bis(2-chloroethylsulfonyl)benzene.

|  | Anal. Calc. | Found |
|---|---|---|
| C, percent, weight | 36.3 | 36.6 |
| H, percent, weight | 3.6 | 3.8 |
| S, percent, weight | 19.3 | 19.4 |
| Cl, percent, weight | 21.5 | 20.6 |

Example III

To a glass tube was charged 7.9 g. of styrene, 8.6 g. of methanesulfonyl chloride, 0.75 g. cuprous chloride and 15 ml. of acetonitrile. The tube was sealed and maintained at 80–85° C. for 4 hours. The product mixture was removed, stripped of solvent and filtered. The product, methyl 2-chloro-2-phenylethyl sulfone, was obtained in essentially quantitative yield based upon a 64% conversion, M.P. 73–75° C. after recrystallization from ethanol.

|  | Anal. Calc. | Found |
|---|---|---|
| C, percent, weight | 49.6 | 49.5 |
| H, percent, weight | 5.0 | 5.1 |
| S, percent, weight | 14.6 | 14.6 |
| Cl, percent, weight | 16.2 | 14.7 |

Similar reactions are effected when cupric chloride is employed as the catalyst.

Example IV

According to the procedure of Example III, 4.0 g. of acrylonitrile was reacted with 8.6 g. of methanesulfonyl chloride in the presence of 0.75 g. of cuprous chloride and 15 ml. of acetonitrile. The product, methyl 2-chloro-2-cyanoethyl sulfone, was obtained in 12% yield based upon reactants charge, M.P. 68–71° C.

|  | Anal. Calc. | Found |
|---|---|---|
| C, percent, weight | 28.6 | 27.9 |
| H, percent, weight | 3.9 | 3.9 |
| S, percent, weight | 19.2 | 19.1 |
| N, percent, weight | 7.3 | 7.7 |
| Cl, percent, weight | 21.2 | 19.1 |

Example V

The procedure of Example III was repeated, substituting 5.6 g. of 2-butene for the styrene of that example. Three grams of crude product, methyl 3-chloro-2-butyl sulfone, $n_D^{25}$ 1.4817, was obtained, which represented a 23% yield based upon reactants charged. The infrared spectrum exhibited a band characteristic of the sulfone linkage.

|  | Anal. Calc. | Found |
|---|---|---|
| C, percent, weight | 35.2 | 33.6 |
| H, percent, weight | 6.5 | 6.4 |
| S, percent, weight | 18.8 | 19.1 |
| Cl, percent, weight | 20.9 | 18.5 |

Example VI

When p-bromobenzenesulfonyl bromide is reacted with 1-pentene in tetrahydrofuran solution, in the presence of cuprous bromide as catalyst, a good yield of p-bromophenyl 2-bromoamyl sulfone is obtained.

We claim as our invention:

1. The process for the production of a β-haloorganosulfone by the 1,2-addition of an organic sulfonyl halide having up to 40 carbon atoms and from 1 to 6 sulfonyl halide substituents wherein the halogen has an atomic number from 17 to 35 to an olefinic compound in the presence of a catalytic amount of a copper salt.

2. The process of claim 1 wherein the copper salt is cuprous halide.

3. The process for the production of a β-halo sulfone by the 1,2-addition of an organic mono- to trisulfonyl halide, said halide having an atomic number from 17 to 35, wherein the organic moiety is selected from the group consisting of saturated aliphatic radicals having from 1 to 18 carbon atoms and mononuclear aromatic radicals having from 6 to 10 carbon atoms, to an olefinic compound having 2 to 10 carbon atoms and 1 to 3 isolated carbon-carbon double bonds in the presence of a catalytic amount of cuprous halide.

4. The process for the production of a β-chloro sulfone by the 1,2-addition of saturated aliphatic mono- to trisulfonyl chloride having from 1 to 18 carbon atoms to an acyclic monoolefinic compound having 2 to 10 carbon atoms in the presence of a catalytic amount of cuprous chloride.

5. The process of claim 4 wherein the acyclic monoolefinic compound is ethylene.

6. The process of claim 4 wherein the acyclic monoolefinic compound is styrene.

7. The process of claim 4 wherein the sulfonyl chloride is a monosulfonyl chloride.

8. The process for the production of a β-chloro sulfone by the 1,2-addition of mononuclear aromatic mono- to trisulfonyl chloride having 6 to 10 carbon atoms to acyclic monoolefinic compound having 2 to 10 carbon atoms in the presence of a catalytic amount of cuprous chloride.

9. The process of claim 8 wherein the acyclic monoolefinic compound is ethylene.

10. The process for the production of methyl 2-chloro-2-cyanoethyl sulfone by the 1,2-addition of methanesulfonyl chloride to acrylonitrile in the presence of a catalytic amount of cuprous chloride.

References Cited by the Examiner

UNITED STATES PATENTS 2,573,580   10/1951   Ladd _____ 260—607
3,022,344   2/1962   Heininger et al. _____ 260—607

CHARLES B. PARKER, *Primary Examiner.*

DANIEL D. HORWITZ, *Examiner.*

D. R. PHILLIPS, *Assistant Examiner.*